United States Patent [19]

Chaplin

[11] 4,090,459
[45] May 23, 1978

[54] SIDE LUBRICATED SEAL DEVICE FOR A SURFACE EFFECT SHIP

[75] Inventor: John B. Chaplin, Covington, La.

[73] Assignee: Textron Inc., Providence, R.I.

[21] Appl. No.: 781,292

[22] Filed: Mar. 25, 1977

[51] Int. Cl.² .............................................. B63B 1/38
[52] U.S. Cl. ................................ 114/67 A; 180/122; 180/128
[58] Field of Search .......................... 114/67 A, 67 R; 180/116, 117, 119–122, 124, 127–130

[56] References Cited

U.S. PATENT DOCUMENTS

| 3,518,956 | 7/1970 | Girodin | 114/67 A |
| 3,987,865 | 10/1976 | Krupp | 180/127 |

FOREIGN PATENT DOCUMENTS 1,210,973  11/1970  United Kingdom .............. 114/67 A Primary Examiner—Trygve M. Blix
Assistant Examiner—Stuart M. Goldstein
Attorney, Agent, or Firm—Bean, Kauffman & Bean

[57] ABSTRACT

In a surface effect ship of the type having at least two relatively spaced wall-like stationary structures extending longitudinally beneath the main body of the ship into and below the water line of the ship to partially confine thereunder the ship support air cushion, and a seal device of the inflatable bag type extending laterally between the stationary structures to assist in sealing the air cushion beneath the ship; the seal bag being apertured through its opposite end wall portions to permit egress of air therethrough so as to lubricate movements of the end wall portions relative to the stationary structures.

9 Claims, 10 Drawing Figures

U.S. Patent  May 23, 1978  Sheet 1 of 2  4,090,459
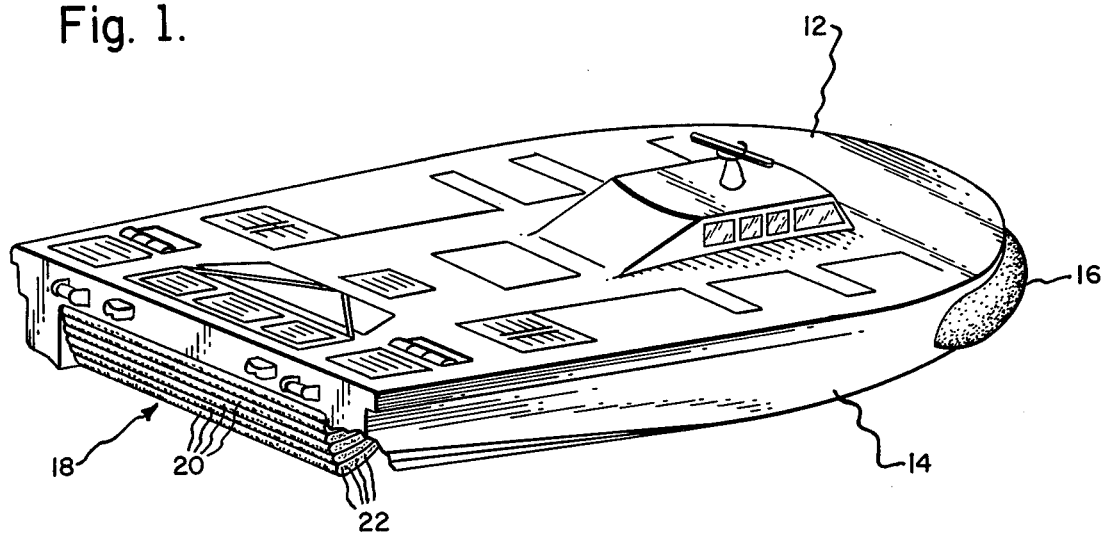
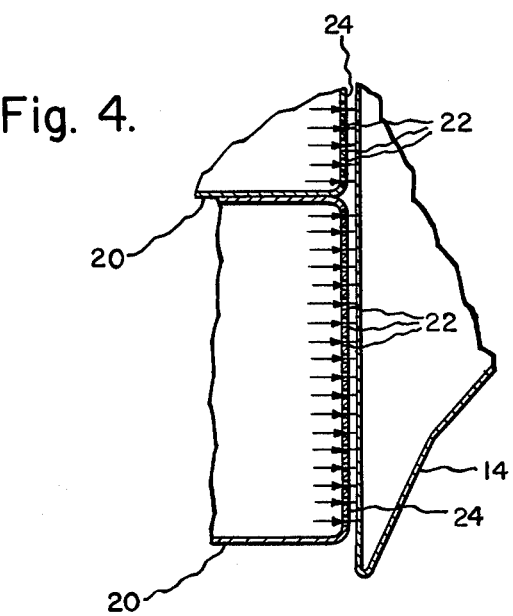
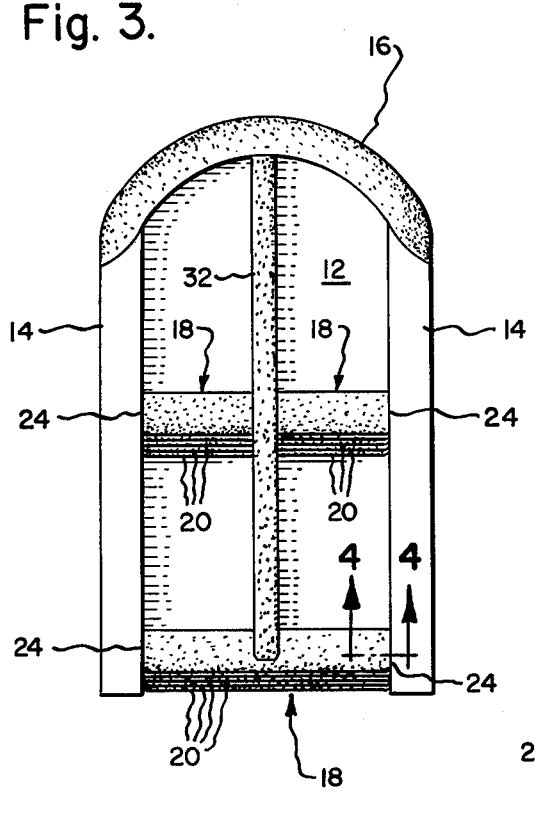
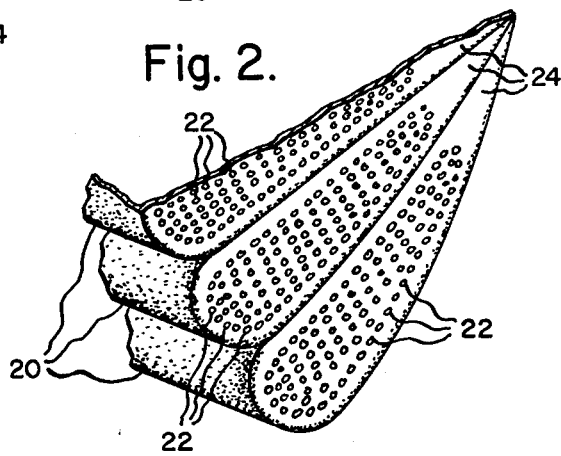

SIDE LUBRICATED SEAL DEVICE FOR A SURFACE EFFECT SHIP

BACKGROUND AND OBJECT OF THE INVENTION

This invention relates to air cushion supported vehicles, and more particularly to marine vessels of such type which are sometimes referred to as surface effect ships ("SES"). Specifically, the invention relates to flexible air cushion seals comprising one or more inflatable bags or "lobes" which move against stationary parts of the vehicle. For example, such seal devices may be used at the stern of a "SES" to extend between the side hulls or skegs of the ship as shown for example in U.S. Pat. No. 3,977,491; or, between air cushion space partitioning keels or skegs or the like for stability purposes, such as shown at 28 in U.S. Pat. No. 3,524,517. Such inflatable seals may also be employed to seal the air cushion at the bow end of the ship; and may comprise either a single bag or "lobe", or pluralities thereof arranged in superposed relation. In any case the seal device is hingedly affixed at its forward end to the hull structure so as to bridge the water/air cushion space beneath the ship, while the major body portion thereof is adapted to float vertically in conformity with the passing of waves or other obstacles under the craft; thereby maintaining the air cushion under the vessel. As the seal moves vertically, such as in response to wave influences thereunder, the opposite ends of the seal slide vertically against the adjacent stationary structures of the vehicle. The purpose of this invention is to eliminate or at least minimize the frictional resistance effects which would otherwise deleteriously wear or tear the fabric of the seal incidental to rubbing contacts between the ends of the seal and the stationary structures of the vehicle. Reference is also made to U.S. Pat. Nos. 3,205,847 and 3,524,517.

BRIEF SUMMARY OF THE INVENTION

According to the invention, the ends of the lobe(s) of the seal structure are apertured and are otherwise configured so as to permit egress of compressed air from interiorly of the seal, thereby providing compressed air lubrication of the end portions of the seal structure relative to stationary structural portions of the vessel; thereby eliminating or at least reducing frictional damage to the opposite ends of the seal, while at the same time efficiently maintaining the air cushion under the vessel.

DETAILED DESCRIPTIONS OF PREFERRED EMBODIMENTS OF THE INVENTION

Exemplary embodiments of the invention are described in detail hereinafter as are illustrated by the accompanying drawing.

THE DRAWING

FIG. 1 is a stern end perspective view of a surface effect ship embodying a stern end air cushion seal arrangement embodying the present invention; a corner portion of one of the side hulls of the vessel being cut away to show one end of the seal fabrication;

FIG. 2 is an enlarged scale fragmentary view of a portion of the end of the seal showing in FIG. 1;

FIG. 3 is a bottom plan view of a SES vehicle having seal devices of the present invention both at the stern thereof and also intermediately of a centrally disposed stabilizing keel structure thereof;

Figure 5:
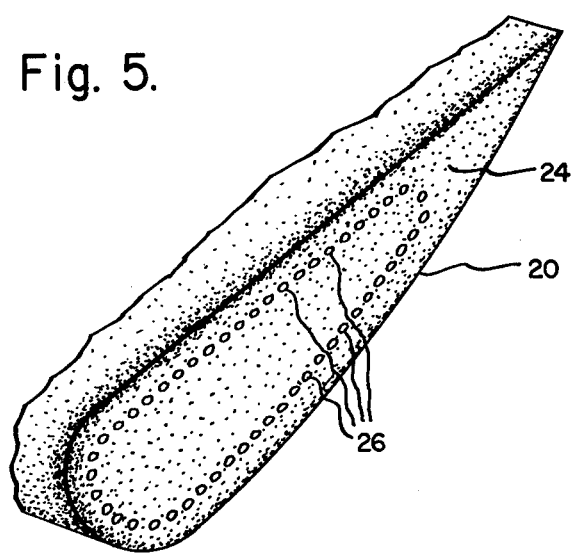
Figure 6:
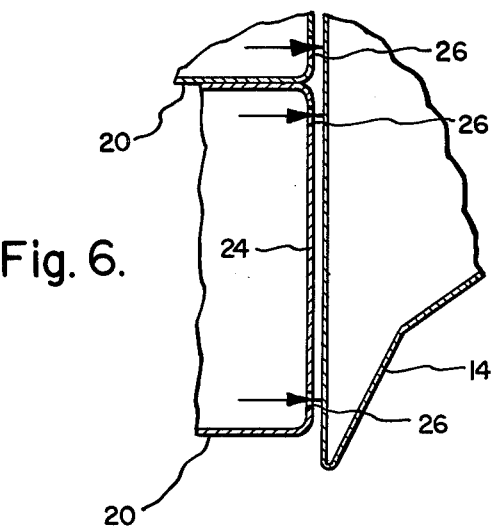
Figure 7:
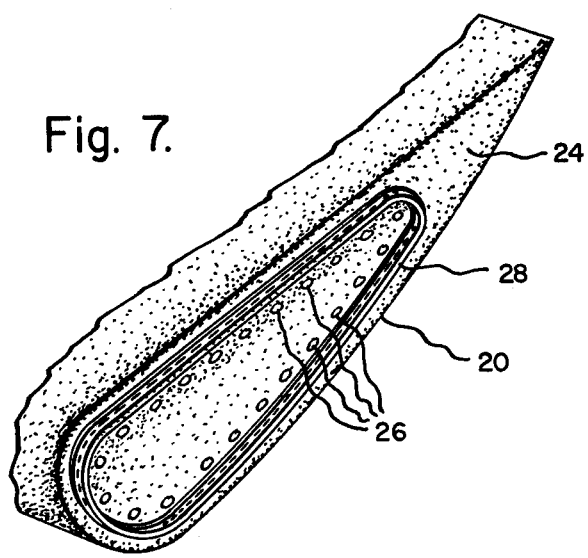
Figure 8:
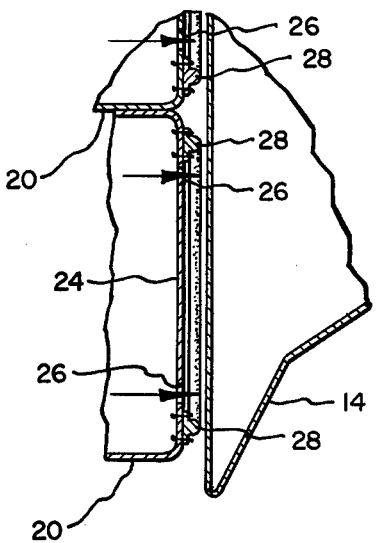
Figure 9:
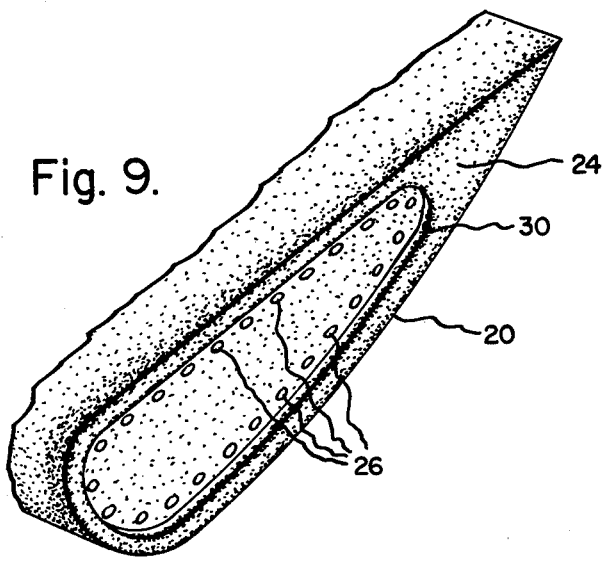
Figure 10:
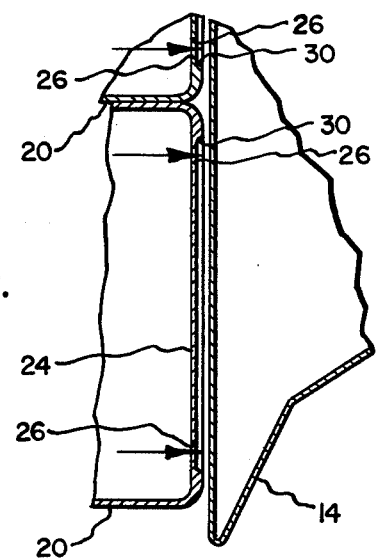

FIG. 4 is a fragmentary sectional view on enlarged scale, taken as suggested by lines 4—4 of FIG. 3; FIGS. 5, 7 and 9 are views corresponding to portions of FIG. 2 but showing modified forms of seal lobe end fabrications and lubricating air projecting aperture arrangements; and FIGS. 6, 8 and 10 are views corresponding to FIG. 3; but illustrate the air lubricating performances of the seal fabrications of FIGS. 5, 7, 9, respectively.

As shown at FIGS. 1, 3, the invention is embodied in a generally conventional type surface effect ship having a main structure or platform 12 which is buoyantly supported relative to a body of water by means of opposite side hulls 14—14. To enable the ship to operationally ride substantially higher upon a cushion of air, the side hulls are encompassed at the bow end of the ship by means of a bow seal device 16 and at the stern end of the ship by means of a seal device 18 extending laterally between the stern ends of the hulls 14—14. Thus, as shown in the above referenced patents, the space beneath the ship platform 12 is adapted to confine a cushion of air for partially raising the ship out of water whenever a suitable supply of compressed air (or other gas) is furnished thereto by means of blowers, as is well known in the art. Whereas the invention is illustrated and further described in detail herein as being embodied in a stern seal comprising a vertical laminate of individually air-inflatable bags 20 of the so-called lobe type, it is also to be understood that either one or more of such bags may be employed for that purpose, and that the invention may similarly be embodied in a bow seal or substituted for an intermediately disposed seal system for purposes as shown in U.S. Pat. No. 3,524,517.

In any case such bag(s) include opposite end wall portions which are typically formed of flexible sheet material, and which under operating conditions constantly move (primarily vertically) in response to wave action relative to the adjacent hard wall surfaces of the hulls 14—14. Thus in the case of the prior art the fabric of the end walls of the seal structure are constantly subjected to wear and tear deteriorating forces. In the case of the present invention the opposite end walls of the seal bag(s) 20 are perforated so as to permit egress of air from the interior(s) of the bag(s) so as to air-lubricate the otherwise frictional motions therebetween; the rate of egress of air being of course responsive to the pressure differential between the interior(s) of the bag(s) and the ambient air cushion.

The sizings/numbers/locations of the above referred to perforations will of course depend upon engineering choices, which will in turn depend upon the configurations and dimensions of the end walls of the bag(s). As shown for example at FIGS. 1 and 2 and 4, the perforations 22 may be distributed substantially throughout the end view areas 24 of the bag(s) 20. FIG. 5 illustrates how, alternatively, a ring of such apertures may be provided through the end wall 24 so as to substantially complement the profile of the end wall of the bag while providing suitable air-lubrication, as explained hereinabove.

FIGS. 7, 8, illustrate a modified form of the bag end wall lubrication system of the invention as shown at FIGS. 5, 6, wherein an outstanding gasket member 28 is provided to encompass the area occupied by the apertures 26; whereby to more efficiently retain the air-lubrication effect. The gasket 28 may of course be fabricated of any suitable wear-resistant material whereby to further contribute to minimization of wear/tear deterioration of the bag structure. FIGS. 9, 10, illustrate still another means for efficiently confining the air-lubricating effect between the end wall of the bag and the hard structure of the ship. In this case a portion of the end wall 24 of the bag 20 is "countersunk" or recessed as indicated at 30, so as to encompass the area occupied by the apertures 26.

It will be appreciated that the present invention provides means for minimizing wear and tear deterioration stresses upon floating type air cushion seals such as are currently employed in surface effect ships or the like.

I claim:

1. In combination, a surface effect ship of the type having at least two relatively spaced rigid wall structures each having inboard and outboard sides extending beneath the main body of the ship into and below the water line of the ship to partially confine thereunder the ship support air cushion and having a seal device comprising a self-contained inflatable bag extending between the inboard sides of said rigid structures operating to assist in sealing the air cushion beneath said ship, said inflatable bag having apertured opposite end wall portions which are spaced from and positioned adjacent to the inboard sides of said spaced wall structures to permit egress of pressurized gas between the end wall portions of the bag and the inboard sides of the spaced wall portions so as to lubricate movements of said end wall portions relative to said rigid, spaced wall structures.

2. The combination as set forth in claim 1 wherein said seal device comprises a laminate of adjacently disposed inflatable pillow type bag members.

3. The combination as set forth in claim 1 wherein said seal device is employed to air-cushion-seal the stern end of said ship.

4. The combination as set forth in claim 1 wherein said seal device is disposed intermediately of the longitudinal extent of said main body of said ship.

5. The combination as set forth in claim 1 wherein the apertured end wall portions of said seal device include a generally flat form which is discretely perforated to provide apertures therethrough permitting limited jet-like egress of pressurized gas from the interior of said seal device.

6. The combination and seal device as set forth in claim 5 wherein said apertures are disposed substantially throughout the areas of said end wall portions.

7. The combination and seal device as set forth in claim 5 wherein said apertures are series-aligned to inscribe the profile peripheries thereof.

8. The combination and seal device as set forth in claim 5 wherein said apertures are encircled by laterally projecting gasket devices.

9. The combination and seal device as set forth in claim 5 wherein said apertures are located within recessed portions of said end walls.

* * * * *